(12) United States Patent
Liu et al.

(10) Patent No.: US 11,073,143 B2
(45) Date of Patent: Jul. 27, 2021

(54) SOUND GENERATOR

(71) Applicant: AAC Technologies Pte. Ltd., Singapore (SG)

(72) Inventors: Xiaodong Liu, Shenzhen (CN); Bo Xiao, Shenzhen (CN); Ronglin Linghu, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 106 days.

(21) Appl. No.: 16/711,403

(22) Filed: Dec. 11, 2019

(65) Prior Publication Data
US 2020/0208621 A1 Jul. 2, 2020

(30) Foreign Application Priority Data

Dec. 30, 2018 (CN) .......................... 201811645411.0

(51) Int. Cl.
| | |
|---|---|
| *F04B 35/04* | (2006.01) |
| *H02M 7/48* | (2007.01) |
| *F04C 18/02* | (2006.01) |
| *H04R 1/22* | (2006.01) |
| *H04R 1/06* | (2006.01) |
| *H04R 9/04* | (2006.01) |

(52) U.S. Cl.
CPC .......... *F04B 35/04* (2013.01); *F04C 18/0215* (2013.01); *H02M 7/48* (2013.01); *F05B 2210/12* (2013.01)

(58) Field of Classification Search
CPC ....... F04B 35/04; H02M 7/48; F04C 18/0215; H04R 1/225; H04R 1/06; H04R 9/046
USPC ........ 381/396, 191, 386, 150, 400, 398, 401
See application file for complete search history.

(56) References Cited

U.S. PATENT DOCUMENTS

| | | | |
|---|---|---|---|
| 10,250,989 B1* | 4/2019 | Xiao | ...................... H04R 31/003 |
| 2018/0020303 A1* | 1/2018 | Shi | .......................... H04R 9/046 |
| 2018/0367890 A1* | 12/2018 | Gu | ........................... H04R 1/02 |

* cited by examiner

*Primary Examiner* — Thjuan K Addy
(74) *Attorney, Agent, or Firm* — W&G Law Group LLP

(57) ABSTRACT

The invention provides a sound generator having a frame, a vibration system and a magnetic circuit system carried by the frame. The vibration system includes a diaphragm, a coil and an elastic support assembly. The diaphragm includes a first suspension ring fixed with the frame, a first dome at a center of the first suspension ring, and a second dome stacked on the first dome. The first dome includes a main body, a first wall, and a second wall extending perpendicularly from the first wall for connecting to the coil via the first wall. The first wall is connected to a side surface of the coil. The first wall and the second wall are used for elastically suspending the coil below the diaphragm. Thus, the sound generator has improved high frequency performance.

21 Claims, 6 Drawing Sheets

SOUND GENERATOR

FIELD OF THE PRESENT DISCLOSURE

The invention relates to the field of electroacoustic transducers, in particular to a sound generator applied to a portable electronic product.

DESCRIPTION OF RELATED ART

With the rapid development of portable electronic products such as mobile phone, we have increasingly higher requirements for the functions of products, especially more requirements for the sounding performance of products, hence the development of sound generator applied therein is also accelerated.

The sound generator of related art comprises a frame, a vibration system and a magnetic circuit system with magnetic gap which are respectively fixed at the frame. The vibration system comprises a vibrating diaphragm fixed at the frame, a voice coil fixed at the vibrating diaphragm and inserted in the magnetic gap to drive the vibrating diaphragm to vibrate and generate sound, and elastic support assemblies with one end fixed at the frame and another end fixed at one end of the voice coil far away from the vibrating diaphragm.

However, in the sound generator of related art, the vibrating diaphragm and the elastic support assemblies are fixed at the two opposite ends of the voice coil respectively, although the elastic support assemblies can prevent horizontal swing of the voice coil in vibration effectively, its structure directly connected with the voice coil cause limitation on the design of the voice coil. The volume of the magnetic circuit system is also limited, so that the improvement of the acoustic performance of the sound generator is limited. In addition, the vibrating diaphragm structure of the sound generator in related art comprises a suspension ring and a single dome as provided, which leads to bad high frequency performance, and shall be subject to further improvement.

Therefore, it is necessary to provide an improved sound generator to overcome the above technological problems.

SUMMARY OF THE INVENTION

One of the primary objects of an exemplary embodiment of the present invention is to provide a sound generator with improved high frequency acoustic performance and higher stability.

Accordingly, an exemplary embodiment of the present invention provides a sound generator, including:
a frame;
a magnetic circuit system with a magnetic gap;
a vibration system supported by the frame, including a vibrating diaphragm fixed at the frame, a voice coil inserted in the magnetic gap for driving the vibrating diaphragm to vibrate, and plurality of elastic support assemblies fixed at the frame and opposite to the vibrating diaphragm;
the vibrating diaphragm including
a first suspension ring fixed at the frame;
a first dome provided at a center of the suspension ring and adjacent to one side of the magnetic circuit system;
a second dome overlapping the first dome;
wherein
the first dome comprises a dome body, a first wall extending to the voice coil from one side of the dome body close to the voice coil, a plurality of second walls bending and extending from the end of the first wall; the second walls are connected with the voice coil through the first wall, the second walls are connected with the elastic support assembly and spaced apart from the voice coil; the first wall is connected with a side surface of the voice coil; the first wall and the second walls elastically suspend the voice coil below the vibrating diaphragm.

As an improvement, the elastic support assemblies enclose a hollow area, the voice coil is far away from one end of the first dome and located within the hollow area.

As an improvement, each of the first wall and the second wall comprises two piece provided spaced apart from each other on the two opposite sides of the voice coil.

As an improvement, each second wall comprises a first section spaced apart from the voice coil and a second section extending from the two opposite ends of the first section to the two first walls respectively, the first section is connected with the elastic support assembly, the two second sections of the same second wall are connected with the two first walls respectively.

As an improvement, the voice coil is in a rectangular structure with rounded corners, the four first walls are located at the four rounded corners of the voice coil respectively.

As an improvement, the dome body is in a rectangular structure, the two first walls and the two second walls are located on the two sides of a short axis of the dome body respectively.

As an improvement, the suspension ring is in a hollow structure, and comprises a convex part with a cross section of an arc structure, a first edge part extending horizontally from the convex part to the inside of the suspension ring and a second edge part extending horizontally from the convex part to be far away from the suspension ring; the second dome comprises a middle part glued with the first dome and an extension part extending from the two opposite sides of the middle part to the frame; the first edge part is provided overlapped on the extension part and glued with the extension part.

As an improvement, the extension part is located above the second walls, the extension part and the middle part are integrally formed.

As an improvement, the dome body and the first wall and the second wall are integrally formed.

As an improvement, the dome body and the first wall and the second wall are formed separately.

As an improvement, the first dome is made of any material selected from magnesium-aluminum alloy, carbon fiber, stainless steel or aluminum alloy.

As an improvement, the second dome is made of any material selected from regular aluminum foil, carbon fiber, polyethylene naphthalene dicarboxylate.

As an improvement, the sound generator further includes two elastic support assemblies located on the two opposite sides of the voice coil respectively, wherein each elastic support assembly comprises an elastic part and an auxiliary diaphragm attached to the elastic part; the first section is fixedly connected with one side of the elastic part far away from the auxiliary vibrating diaphragm.

As an improvement, the elastic part comprises a first fixation arm fixed at the frame, two second fixation arms supporting the two second sections fixed at the same second wall and two elastic arms extending from the first fixation arm to the two second fixation arms respectively and forming fixed connection; the auxiliary diaphragm comprises a second suspension ring with a cross section of an arc structure, a first connection part and a second connection part extending from the two opposite sides of the second suspension ring; the first connecting part is fixed at the first fixation arm, the second connecting part is fixed at the first section.

As an improvement, the two elastic support assemblies are connected with the voice coil respectively, the four second fixation arms of the two elastic parts are fixed at the bottom of the voice coil respectively.

As an improvement, the two elastic support assemblies are spaced from the voice coil respectively.

As an improvement, the magnetic circuit system comprises a magnetic yoke, a main magnet fixed at the magnetic yoke and two first auxiliary magnets spaced apart on the two opposite sides of the main magnet respectively and forming the magnetic gap with the main magnet; each first auxiliary magnet is located between the first section on the same side and the voice coil.

As an improvement, the voice coil is in a rectangular structure with rounded corners; the two elastic support assemblies are located on the two sides of a short axis of the voice coil, the two first auxiliary magnets are located on the two sides of a short axis of the voice coil.

As an improvement, the magnetic circuit system further comprises two second auxiliary magnets spaced apart from each other on another opposite two sides of the main magnet; the two second auxiliary magnets are located between the two elastic support assemblies.

As an improvement, the voice coil is in a rectangular structure with rounded corners; the two elastic support assemblies are located on the two sides of the short axis of the voice coil, the two first auxiliary magnets are located on the two sides of the short axis of the voice coil, the two second auxiliary magnets are located on the two sides of the long axis of the voice coil.

As an improvement, the magnetic circuit system further comprises a main pole plate overlapping the main magnet, two first auxiliary pole plates disposed on the two first auxiliary magnets respectively, and an upper splint embedded in the frame, the upper splint comprises an annual fixation ring fixed at the frame and two second auxiliary pole plates extending from the fixation ring to the second auxiliary magnets respectively, the two second auxiliary pole plates are provided overlapped on the two second auxiliary magnets respectively.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to several exemplary embodiment. To make the technical problems to be solved, technical solutions and beneficial effects of the present disclosure more apparent, the present disclosure is described in further detail together with the figures and the embodiment. It should be understood the specific embodiment described hereby is only to explain the disclosure, not intended to limit the disclosure.

Figure 1:
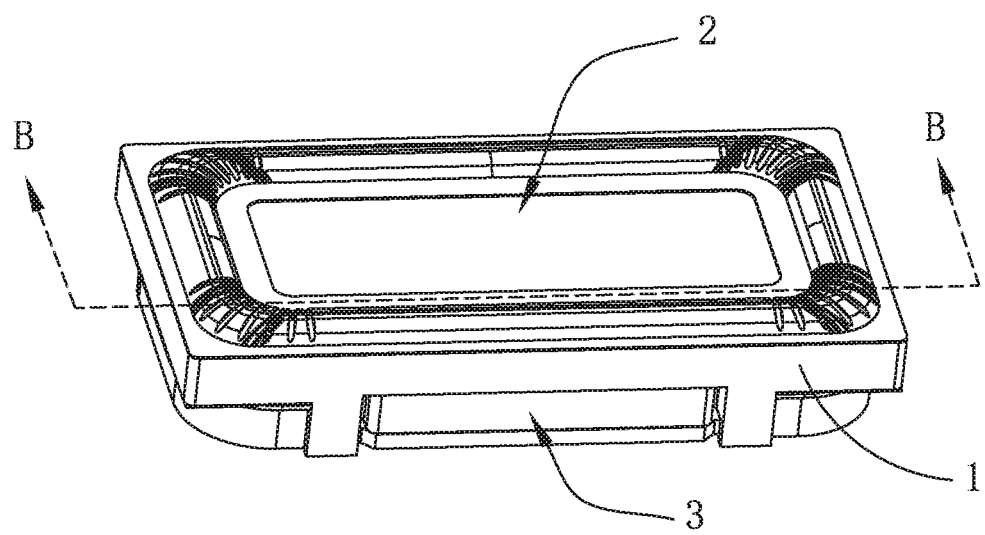
FIG. 1 is an isometric view of a sound generator in accordance with an exemplary embodiment of the present invention.
Figure 2:
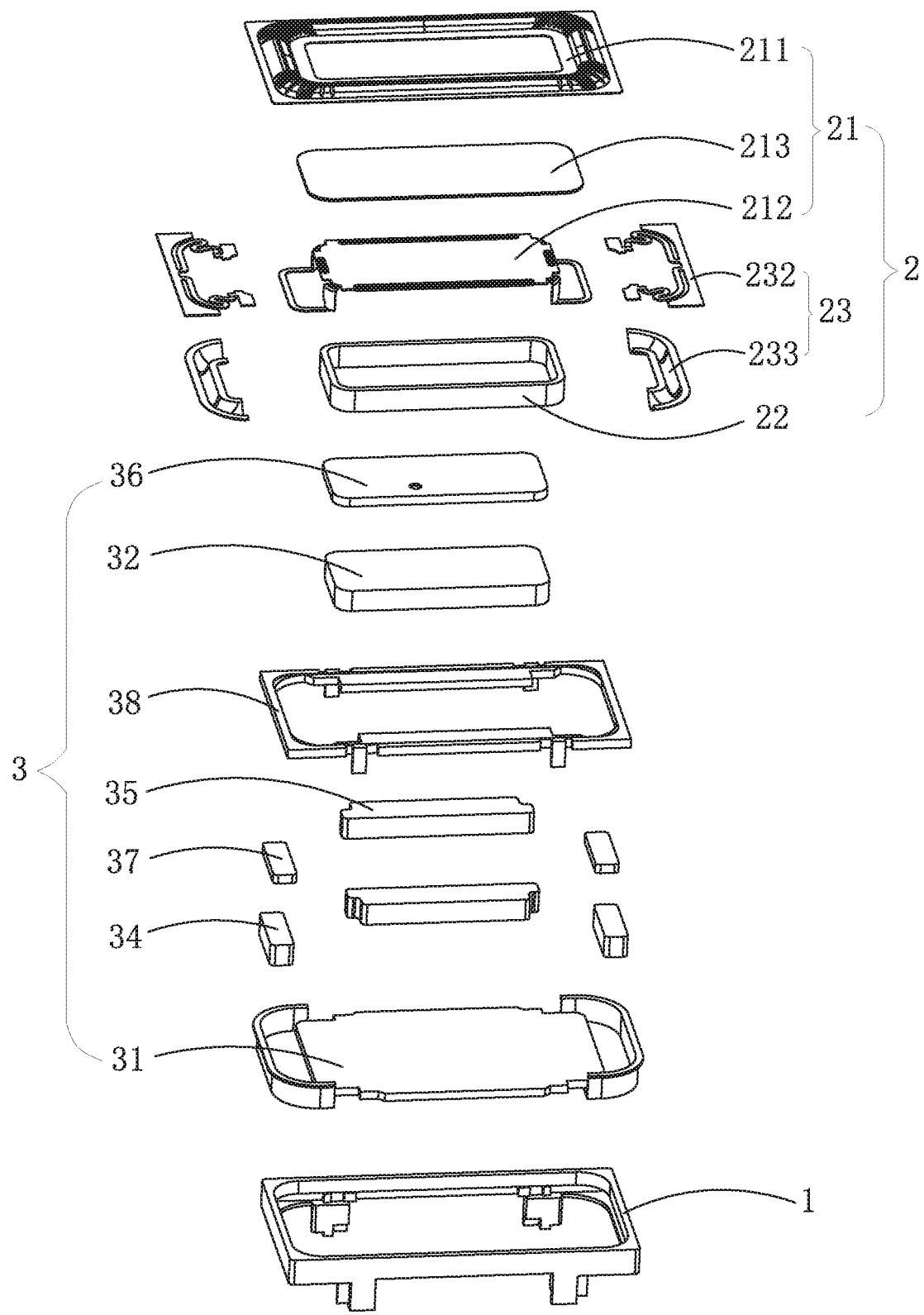
FIG. 2 is an exploded view of the sound generator in FIG. 1.
Figure 3:
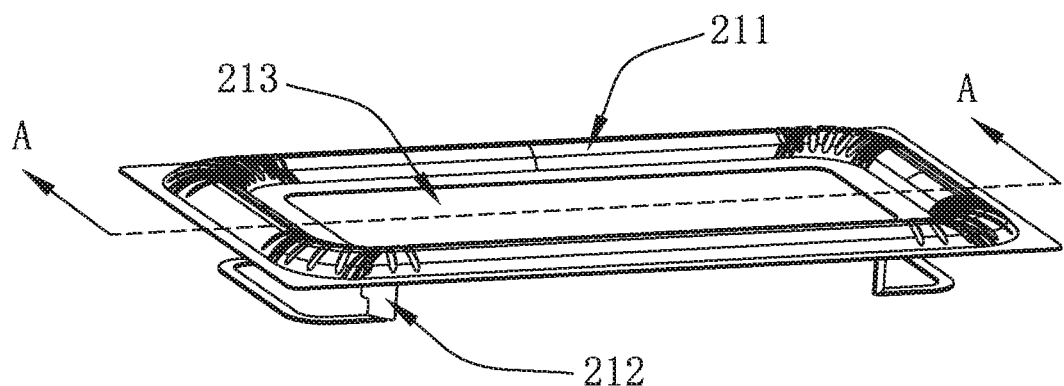
FIG. 3 is an isometric view of a vibrating diaphragm of the sound generator of the embodiment.
Figure 4:
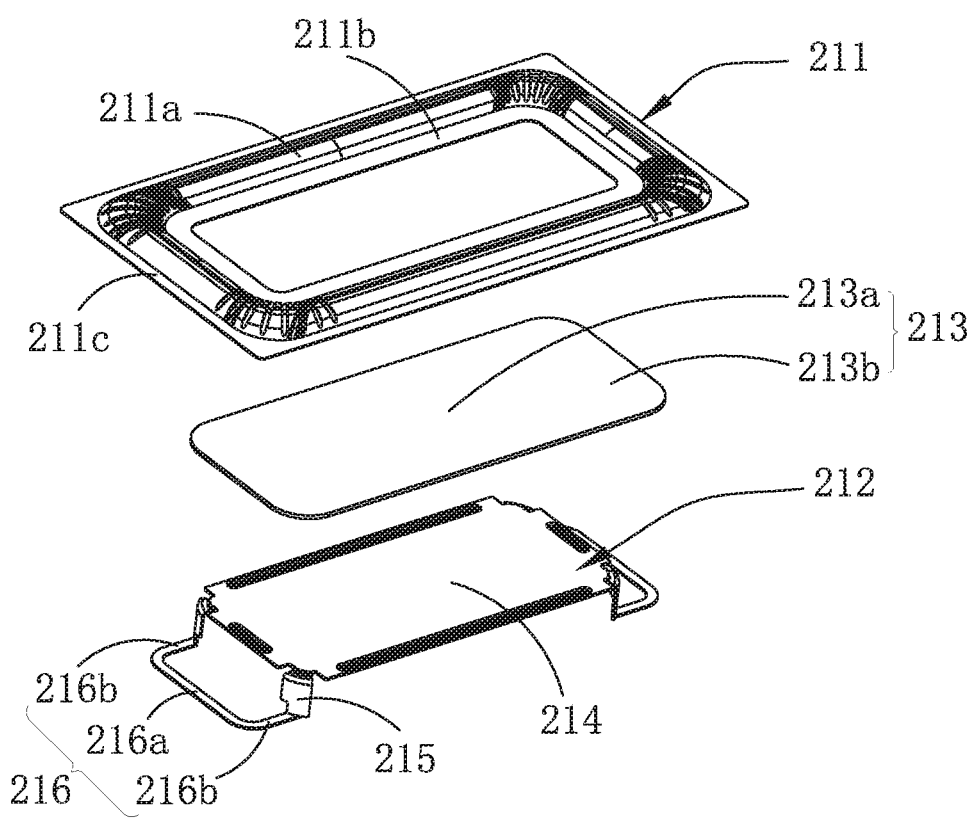
FIG. 4 is an isometric and exploded view of the vibrating diaphragm in FIG. 3.
Figure 5:
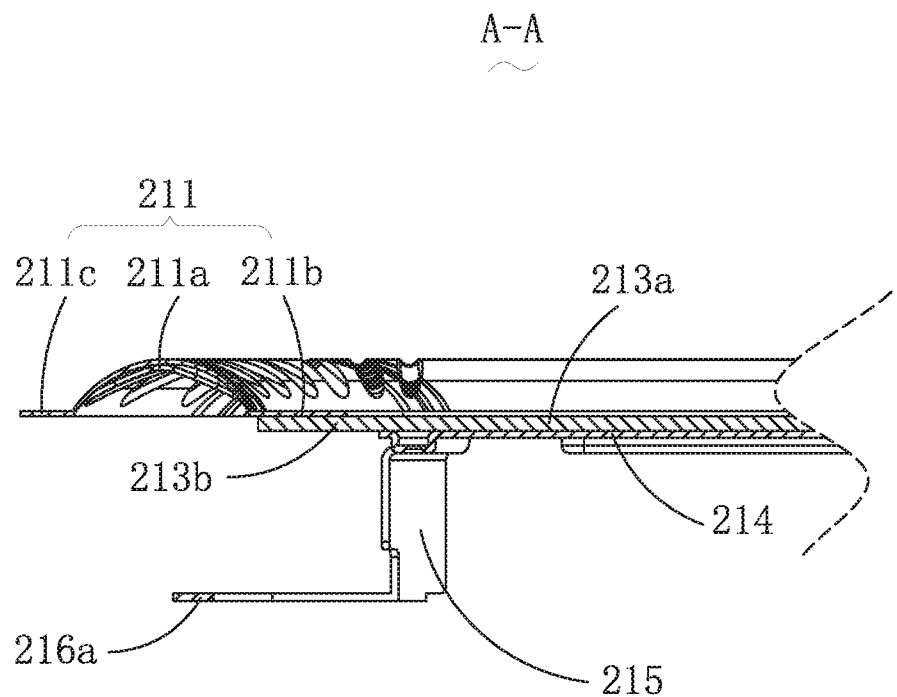
FIG. 5 is a cross-sectional view of the vibrating diaphragm taken along line A-A in FIG. 3.
Figure 6:
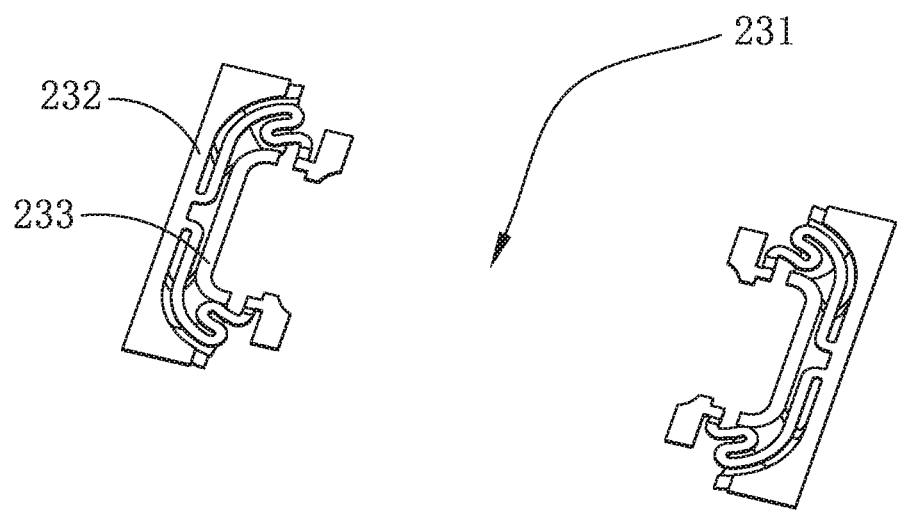
FIG. 6 is an isometric view of an elastic support assembly of the sound generator of the embodiment.
Figure 7:
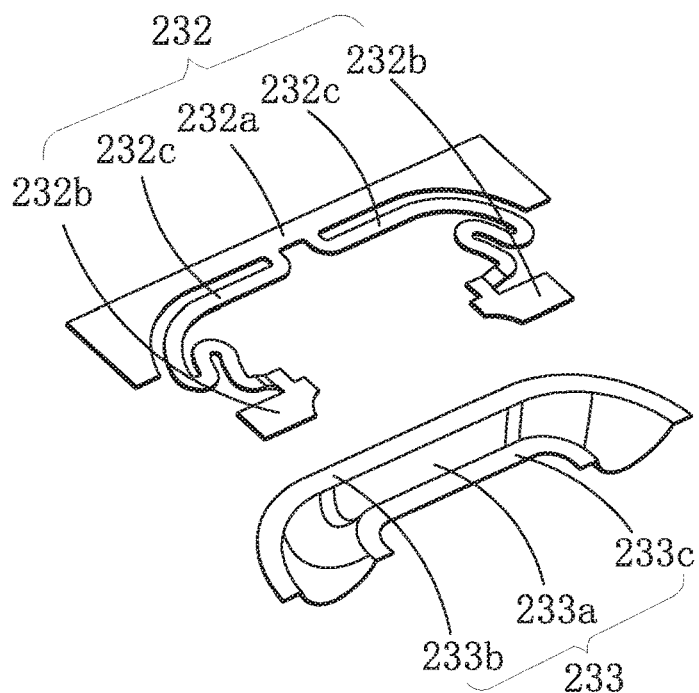
FIG. 7 is an isometric and exploded view of the elastic support assembly in FIG. 6.

As shown in FIG. 1, the invention provides a sound generator 100 which comprises a frame 1, a vibration system 2 and a magnetic circuit system 3. The frame 1 is used to fix and support the vibration system 2 and the magnetic circuit system 3.

As shown in FIGS. 2-5 and 9, the vibration system 2 comprises a vibrating diaphragm 21 fixed at the frame 1, a voice coil 22 driving the vibrating diaphragm 21 to vibrate and sound and elastic support assemblies 23 fixed at the frame 1 and provided opposite to the vibrating diaphragm 21. The vibrating diaphragm 21 comprises a suspension ring 211 fixed at the frame 1, a first dome 212 provided at the center of the suspension ring 211 and close to one side of the magnetic circuit system 3 and a second dome 213 provided overlapped on the first dome.

The magnetic circuit system 3 has a magnetic gap 30, and the voice coil 22 is inserted in the magnetic gap 30.

In this embodiment, the first dome 212 comprises a dome body 214, first walls 215 formed by extending from one side of the dome body 214 close to the voice coil 22 to the voice coil 22 and second walls 216 formed by bending and extending from the end of the first wall 215. The second walls 216 are connected to the voice coil 22 through the first walls 215, the second walls 216 are connected with the elastic support assemblies 23 and spaced apart from the voice coil 22. The first walls 215 are connected with the side face of the voice coil 22. Further, the first walls 215 and the second walls 216 comprise two ones respectively and are provided spaced apart from each other on the two opposite sides of the voice coil 22. Each second wall 216 comprises a first section 216a provided spaced apart from the voice coil 12 and second sections 216b extending from the two opposite ends of the first section 216a to the two first walls 215 respectively. Further, the first section 216a is connected with the elastic support assemblies 23, the two second sections 216b of the same second wall 216 are connected with the two first walls 215 respectively, the first walls 215 and the second walls 216 are used to suspend the voice coil 22 elastically under the vibrating diaphragm 21.

Preferably, the dome body 214 has a rectangular structure, the two first walls 215 and the two second walls 216 are located on the two sides of a short axis of the dome body 214. Furthermore, the suspension ring 211 is in a hollow structure, comprising a convex part 211a with a cross section of an arc structure, a first edge part 211b extending horizontally from the convex part 211a to the inside of the suspension ring 211 and a second edge part 211c extending horizontally from the convex part 211a to be far away from the suspension ring 211. The second dome 213 comprises a middle part 213a glued with the first dome 212 and an extension part 213b extending from the two opposite sides of the middle part 213a to the frame 1. The first edge part 211b is provided overlapped on the extension part 213b and glued with the extension part 213b. Further, the extension part 213b is provided above the second walls 216 and directly facing the interval. Preferably, the extension part 213b and the middle part 213a are in an integrated molded structure. The second dome 213 is provided to get the strength of the entire vibrating diaphragm 21 increased, and the dual-dome provision allows significantly improvement of the high frequency property of the sound generator.

Preferably, the dome body 214 and the first walls 215 and the second walls 216 can be either an integrated molded structure or a split-type structure. For example, in this embodiment, the dome body 214 and the first wall 215 and the second wall 216 are in an integrated molded structure, allowing the entire first dome 212 to be molded more reliably. In addition, the first dome 212 is made of any material among magnesium-aluminum alloy, carbon fiber, stainless steel or aluminum alloy. Of course, the material of the first dome 212 is not limited to that, any low-density, high-hardness and moldable material can be used for making the first dome 212. The second dome is made of any material among regular aluminum foil, carbon fiber, polyethylene naphthalene dicarboxylate.

As shown in FIGS. 4-7, in this embodiment, the elastic support assemblies 23 enclose a hollow area 231 together, one end of the voice coil 22 far away from the first dome 212 is located within the range of the hollow area 231. Preferably, the elastic support assemblies 23 comprise two ones and are located on the two opposite sides of the voice coil 22 respectively, the two elastic support assemblies 23 enclose the hollow area 231.

Specifically, each elastic support assembly 23 comprises an elastic part 232 and an auxiliary diaphragm 233 attached to the elastic part 232. The first section 216a is fixedly connected with one side of the elastic part 232 far away from the auxiliary diaphragm 233.

The elastic part 232 comprises a first fixation arm 232a fixed at the frame 1, two second fixation arms 232b supporting the two second sections 216b fixed at the same second wall 216 and the two elastic arms 232c extending from the first fixation arm 232a to the two second fixation arms 232b respectively and forming fixed connection. The fixed connection between the two second fixation arms 232b and the first fixation arms 232a can be a direct connection or indirect one. For example, in this embodiment, each second fixation arm 232b and the frame 1 are provided spaced apart from each other and form direct connection with the first fixation arm 232a through the elastic arm 232c on the same side. Of course, the two second fixation arms 232b are fixed at the frame 1 respectively, it's also feasible for each second fixation arm 232b to form indirect connection with the first fixation arms 232a through the elastic arm 232c on the same side.

The auxiliary diaphragm 233 comprises a second suspension ring 233a with a cross section of an arc structure, a first connection part 233b and a second connection part 233c extending from the two opposite sides of the second suspension ring 233a. The first connection part 233b is fixed at the first fixation arm 232a, the second connection part 233c is fixed at the first section 216a of the second wall 216.

The elastic support assemblies 23 are used to improve the vibration reliability of the vibration system 2. In this embodiment, two elastic support assemblies 23 are provided to form a symmetric structure of the dual elastic support assemblies, resulting in more stable support for the voice coil 22, so as to prevent horizontal swing of the voice coil 22, improve the vibration reliability of the vibration system 2, hence achieving good reliability of the sound generator.

Preferably, the elastic part 232 is a flexible board, the voice coil 22 is electrically connected with the elastic part 232, on one hand, to provide support for the voice coil 22, on another hand, to introduce an external electrical signal for the voice coil 22, thus avoiding the problem of susceptibility to disconnection when introducing the external electrical signal for the voice coil 22 through a lead, so as to improve its reliability.

In the above structure, the voice coil 22 forms fixation with the vibrating diaphragm 21 through the first walls 215, such structure achieves effective inhibition on the horizontal swing of the voice coil 22 through the first walls 215, improving the reliability and stability of the sound generator 100; meanwhile, the first wall 215 is fixed and glued on the side of the voice coil 22, such structure releases the structural design of the voice coil 22, allowing its location to float up and down along the vibration direction of the vibrating diaphragm 21, thus the height of the voice coil 22 is no longer limited by the elastic support assemblies 23, and the overall height of the sound generator can be designed thinner.

In this embodiment, it's described with the example of a rectangular structure with rounded corners of the voice coil 22, the four first walls 215 are located at the four rounded corners of the voice coil 22. So the first dome 212 is glued at the voice coil 22 more reliably, more effectively inhibiting the horizontal swing of the voice coil 22, so as to further improve the vibration reliability of the vibration system 2. Furthermore, the dual-dome structure of the first dome 212 and the second dome 213 provided overlapped on it is provided to increase the strength of the whole vibration system while improve the high frequency property of the sound generator 100 effectively.

Moreover, in the above structure, the two second walls 216 of the first dome 212 are provided. The auxiliary vibrating diaphragm 233 is indirectly connected with the voice coil 22, i.e., the auxiliary vibrating diaphragm 233 forms indirect connection with the voice coil 22 through the second walls 216, allowing to form a certain avoiding space between the auxiliary vibrating diaphragm 233 and the voice coil 22, such avoiding space can have a magnet provided therein, thus releasing the structural design of the magnetic circuit system 3. The elastic support assembly 23 is not directly glued with the bottom of the voice coil 22, so as to avoid the interference between the magnetic circuit system 3 and the elastic support assembly 23, thus it's unnecessary for the magnetic circuit system 3 to avoid the elastic support assembly 23, hence the magnetic circuit system can achieve an optimized structure to effectively improve the acoustic performance of the sound generator 100.

It's worth mentioning that the elastic support assemblies 23 and the voice 22 are provided spaced apart from each other or interconnected. In this embodiment, the two elastic support assemblies 23 are connected with the voice coil 22 respectively, the four second fixation arms 232b of the two elastic parts 23 are fixed at the bottom of the voice coil 22 respectively. The second fixation arms 232b provides bottom support for voice coil 22 to improve the vibration reliability of voice coil 22, thus improving the reliability of the sounding vice.

Figure 8:
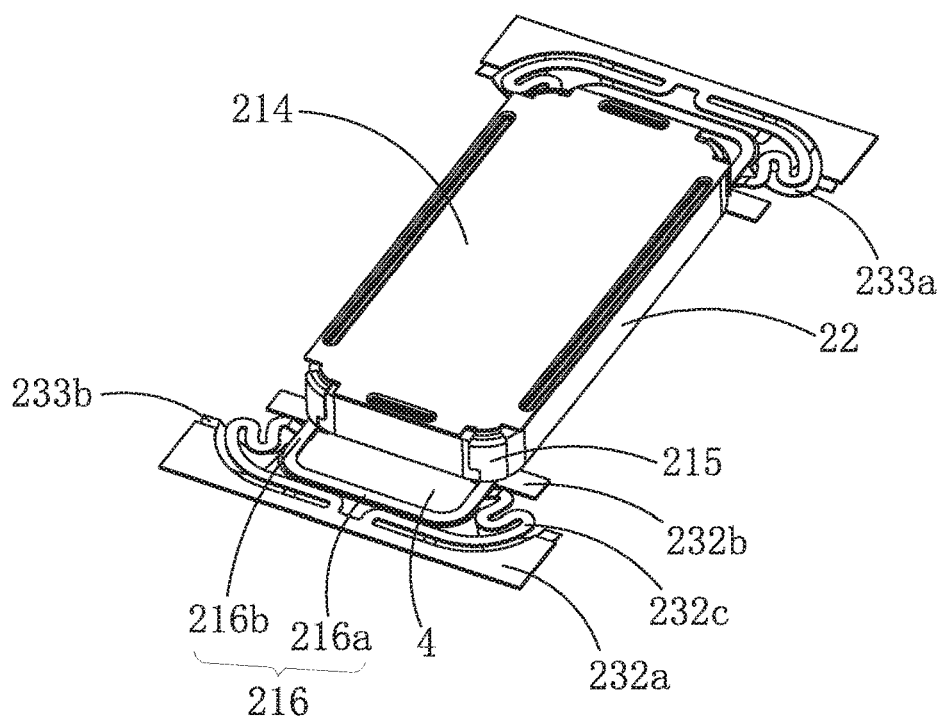
FIG. 8 is an isometric view of a first dome, the elastic support assembly and a voice coil of the sound generator of the present invention.
Figure 9:
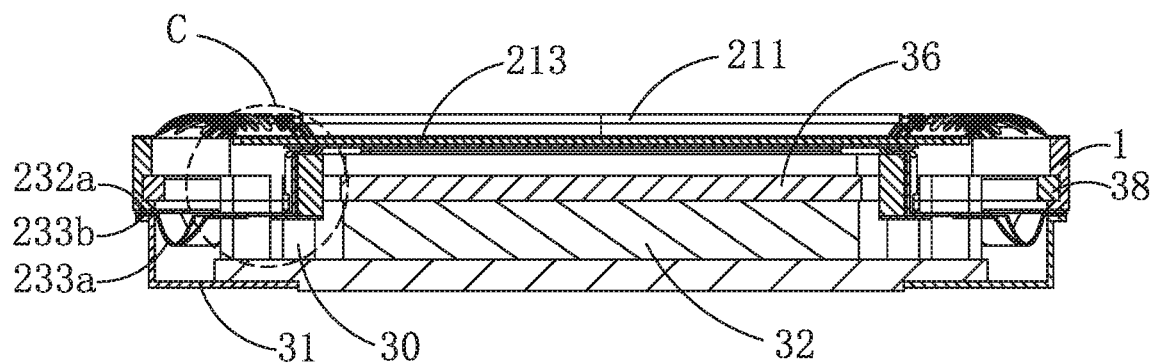
FIG. 9 is a cross-sectional view of the sound generator taken along line B-B of FIG. 1.
Figure 10:
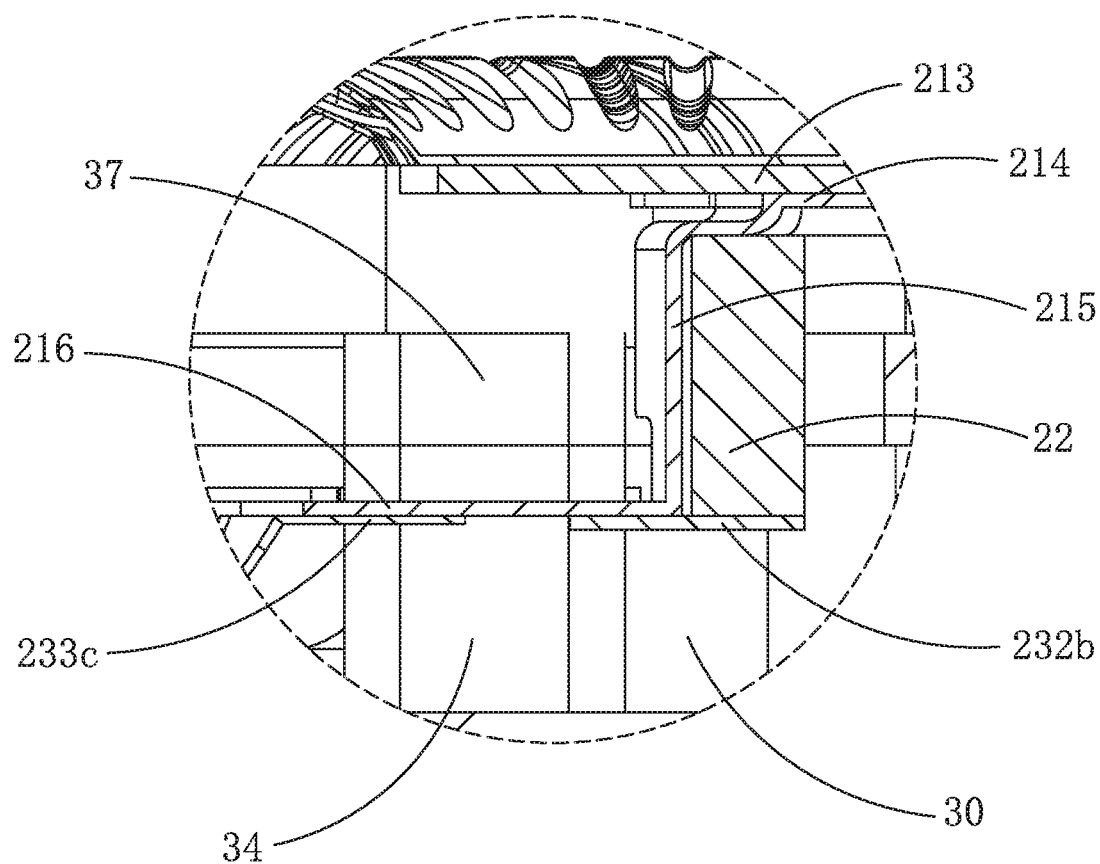
FIG. 10 is an enlarged view of Part C in FIG. 7.

As shown in FIGS. 8-10, the magnetic circuit system 3 comprises a magnetic yoke 31, a main magnet 32 fixed at the magnetic yoke 31 and two first auxiliary magnets 34 provided spaced apart from each other on the two opposite sides of the main magnet 32 respectively and forming the magnetic gap 30 with the main magnet 32. Each first auxiliary magnet 34 is located between the first section 216a on the same side as it and the voice coil 22, i.e., each first auxiliary magnet 34 is accommodated inside the accommodation space 4 formed by the elastic support assemblies 23 on the same side as it and the voice coil 22. Now, the magnetic circuit system 3 has three magnets, in actual applications, it further allows to optimize the design in which the magnetic circuit system 3 can be provided as a magnetic circuit of three magnets, and the magnetic circuit system 3 can be further optimized into a magnetic circuit of five magnets.

When the magnetic circuit system 3 is a magnetic circuit of three magnets (tri-magnet circuit), take the example of a rectangular structure with rounded corners of the voice coil 22, the two elastic support assemblies 23 are located on the two sides of the short axis of the voice coil 22. The two first auxiliary magnets 34 are located on the two sides of the short axis of the voice coil 22, and each first auxiliary magnet 34 is located between the first section 216a on the same side as it and the voice coil 22, i.e., each first auxiliary magnet 34 is accommodated inside the accommodation space 4 formed by the elastic support assemblies 23 on the same side as it and the voice coil 22. Now, the tri-magnet circuit structure brings good driving performance of the magnetic circuit system 3, thus bringing good acoustic performance of the sound generator 100.

When the magnetic circuit system 3 is a magnetic circuit of five magnets (five-magnet circuit), e.g., in this embodiment, to further utilize the space effectively, increase the volume of the magnetic circuit system 3, the magnetic circuit system 3 also comprises two second auxiliary magnets 35 provided spaced apart on another two opposite sides of the main magnet 32 respectively; the two second auxiliary magnets 35 are located between the two elastic support assemblies 23.

Further, taking the example of a rectangular structure with rounded corners of the voice coil 22, the two elastic support assemblies 23 are located on the two sides of the short axis of the voice coil 22, and the two first auxiliary magnets 34 are located on the two sides of the short axis of the voice coil 22. Each first auxiliary magnet 34 is located between the first section 216a on the same side and the voice coil 22, i.e., each first auxiliary magnet 34 is accommodated inside the accommodation space 4 formed by the elastic support assemblies 23 on the same side. The voice coil 22, the two second auxiliary magnets 35 are located on the two sides of the long axis of the voice coil 22. Now, the structure of the magnetic circuit of five magnets has stronger driving performance to produce a better vibration effect of the sound generator 100.

To further improve the performance of the magnetic circuit system 3 and get the magnetic lines of force of the magnetic circuit system 3 cut by the voice coil 22 as much as possible to form bigger driving force, the magnetic circuit system 3 further comprises a main pole plate 36 provided overlapped on the main mgnet 32, two first pole plates 37 provided overlapped on the two first auxiliary magnets 34 respectively and an upper splint 38 embedded in the frame 1, the upper splint 38 comprises an annual fixation ring 381 fixed at the frame 1 and two second auxiliary pole plates 382 extending from the fixation ring 381 to the second auxiliary magnets 35 respectively. The two second auxiliary pole plates 382 are provided overlapped on the two second auxiliary magnets 35 respectively.

In summary, compared to related art, in the sound generator of the invention, the vibrating diaphragm comprises a suspension ring fixed at the frame, a first dome provided at the center of the suspension ring and close to one side of the magnetic circuit system and a second dome provided overlapped on the first dome. The first dome comprises a dome body, a first wall formed by extending from one side of the dome body close to the voice coil to the voice coil and a second wall formed by bending and extending from the end of the first wall. The second wall is connected with the voice coil through the first wall, the second wall is connected with the elastic support assemblies and spaced apart from the voice coil. The first wall is connected with the side face of the voice coil. The first wall and the second wall are used to elastically suspend the voice coil under the vibrating diaphragm.

In the structure, the voice coil forms fixation with the vibrating diaphragm through the first wall, the structure achieves inhibition on the horizontal swing of the voice coil in vibration to improve its reliability.

Meanwhile, the first wall is fixed and glued on the side of the voice coil, such structure releases the structural design of the voice coil, thus the height of the voice coil is no longer limited by the elastic support assemblies, and the overall height of the sound generator can be designed thinner.

Furthermore, by providing the two second walls of the dome, the auxiliary vibrating diaphragm and the voice coil are connected indirectly, i.e., the auxiliary vibrating diaphragm forms an indirect connection with the voice coil through the second walls, allowing to form a certain avoiding space between the auxiliary vibrating diaphragm and the voice coil, such avoiding space can have a magnet provided therein, thus releasing the limit on the design of the magnetic circuit system, thus it's unnecessary for the magnetic circuit system to avoid the elastic support assembly, hence the magnetic circuit system can achieve an maximized structure of three magnetic circuits or five magnetic circuits of multiple magnets, so as to effectively improve the acoustic performance of the sound generator.

Furthermore, a layer of first dome is provided on the first dome, allowing an increase of overall strength of the vibration system together with further improvement of the high frequency performance of the sound generator.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:
1. A sound generator, comprising:
a frame;
a magnetic circuit system with a magnetic gap;
a vibration system supported by the frame, including a vibrating diaphragm fixed at the frame, a voice coil inserted in the magnetic gap for driving the vibrating diaphragm to vibrate, and plurality of elastic support assemblies fixed at the frame and opposite to the vibrating diaphragm;
the vibrating diaphragm including
a first suspension ring fixed at the frame;

a first dome provided at a center of the suspension ring and adjacent to one side of the magnetic circuit system;

a second dome overlapping the first dome;

wherein the first dome comprises a dome body, a first wall extending to the voice coil from one side of the dome body close to the voice coil, a plurality of second walls bending and extending from the end of the first wall;

the second walls are connected with the voice coil through the first wall, the second walls are connected with the elastic support assembly and spaced apart from the voice coil; the first wall is connected with a side surface of the voice coil;

the first wall and the second walls elastically suspend the voice coil below the vibrating diaphragm.

2. The sound generator as described in claim 1, wherein the elastic support assemblies enclose a hollow area, the voice coil is far away from one end of the first dome and located within the hollow area.

3. The sound generator as described in claim 2, wherein each of the first wall and the second wall comprises two piece provided spaced apart from each other on the two opposite sides of the voice coil.

4. The sound generator as described in claim 3, wherein each second wall comprises a first section spaced apart from the voice coil and a second section extending from the two opposite ends of the first section to the two first walls respectively, the first section is connected with the elastic support assembly, the two second sections of the same second wall are connected with the two first walls respectively.

5. The sound generator as described in claim 4, wherein the voice coil is in a rectangular structure with rounded corners, the four first walls are located at the four rounded corners of the voice coil respectively.

6. The sound generator as described in claim 5, wherein the dome body is in a rectangular structure, the two first walls and the two second walls are located on the two sides of a short axis of the dome body respectively.

7. The sound generator as described in claim 6, wherein the suspension ring is in a hollow structure, and comprises a convex part with a cross section of an arc structure, a first edge part extending horizontally from the convex part to the inside of the suspension ring and a second edge part extending horizontally from the convex part to be far away from the suspension ring; the second dome comprises a middle part glued with the first dome and an extension part extending from the two opposite sides of the middle part to the frame; the first edge part is provided overlapped on the extension part and glued with the extension part.

8. The sound generator as described in claim 7, wherein the extension part is located above the second walls, the extension part and the middle part are integrally formed.

9. The sound generator as described in claim 6, wherein the dome body and the first wall and the second wall are integrally formed.

10. The sound generator as described in claim 6, wherein the dome body and the first wall and the second wall are formed separately.

11. The sound generator as described in claim 1, wherein the first dome is made of any material selected from magnesium-aluminum alloy, carbon fiber, stainless steel or aluminum alloy.

12. The sound generator as described in claim 1, wherein the second dome is made of any material selected from regular aluminum foil, carbon fiber, polyethylene naphthalene dicarboxylate.

13. The sound generator as described in claim 4 comprising two elastic support assemblies located on the two opposite sides of the voice coil respectively, wherein each elastic support assembly comprises an elastic part and an auxiliary diaphragm attached to the elastic part; the first section is fixedly connected with one side of the elastic part far away from the auxiliary vibrating diaphragm.

14. The sound generator as described in claim 13, wherein the elastic part comprises a first fixation arm fixed at the frame, two second fixation arms supporting the two second sections fixed at the same second wall and two elastic arms extending from the first fixation arm to the two second fixation arms respectively and forming fixed connection; the auxiliary diaphragm comprises a second suspension ring with a cross section of an arc structure, a first connection part and a second connection part extending from the two opposite sides of the second suspension ring; the first connecting part is fixed at the first fixation arm, the second connecting part is fixed at the first section.

15. The sound generator as described in claim 14, wherein the two elastic support assemblies are connected with the voice coil respectively, the four second fixation arms of the two elastic parts are fixed at the bottom of the voice coil respectively.

16. The sound generator as described in claim 14, wherein the two elastic support assemblies are spaced from the voice coil respectively.

17. The sound generator as described in claim 14, wherein the magnetic circuit system comprises a magnetic yoke, a main magnet fixed at the magnetic yoke and two first auxiliary magnets spaced apart on the two opposite sides of the main magnet respectively and forming the magnetic gap with the main magnet; each first auxiliary magnet is located between the first section on the same side and the voice coil.

18. The sound generator as described in claim 17, wherein the voice coil is in a rectangular structure with rounded corners; the two elastic support assemblies are located on the two sides of a short axis of the voice coil, the two first auxiliary magnets are located on the two sides of a short axis of the voice coil.

19. The sound generator as described in claim 18, wherein the magnetic circuit system further comprises two second auxiliary magnets spaced apart from each other on another opposite two sides of the main magnet; the two second auxiliary magnets are located between the two elastic support assemblies.

20. The sound generator as described in claim 19, wherein the voice coil is in a rectangular structure with rounded corners; the two elastic support assemblies are located on the two sides of the short axis of the voice coil, the two first auxiliary magnets are located on the two sides of the short axis of the voice coil, the two second auxiliary magnets are located on the two sides of the long axis of the voice coil.

21. The sound generator as described in claim 20, wherein the magnetic circuit system further comprises a main pole plate overlapping the main magnet, two first auxiliary pole plates disposed on the two first auxiliary magnets respectively, and an upper splint embedded in the frame, the upper splint comprises an annual fixation ring fixed at the frame and two second auxiliary pole plates extending from the fixation ring to the second auxiliary magnets respectively, the two second auxiliary pole plates are provided overlapped on the two second auxiliary magnets respectively.

\* \* \* \* \*